(12) United States Patent
Ratnakaram et al.

(10) Patent No.: US 11,341,486 B2
(45) Date of Patent: May 24, 2022

(54) SYSTEM FOR SECURE TRANSFER OF ENCRYPTED RESOURCES AND ASYNCHRONOUS EXECUTION

(71) Applicant: Bank of America Corporation, Charlotte, NC (US)

(72) Inventors: Udaya Kumar Raju Ratnakaram, Hyderabad (IN); Rajesh Balireddy, Hyderabad (IN); Pinak Chakraborty, Hyderabad (IN); Nagasubramanya Lakshminarayana, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 238 days.

(21) Appl. No.: 15/985,308

(22) Filed: May 21, 2018

(65) Prior Publication Data
US 2019/0354965 A1 Nov. 21, 2019

(51) Int. Cl.
*G06Q 20/38* (2012.01)
*G06Q 20/22* (2012.01)
*G06Q 20/12* (2012.01)
*G06Q 20/40* (2012.01)
G06Q 20/20 (2012.01)

(52) U.S. Cl.
CPC .......... *G06Q 20/382* (2013.01); *G06Q 20/12* (2013.01); *G06Q 20/227* (2013.01); *G06Q 20/40* (2013.01); *G06Q 20/401* (2013.01); *G06Q 2220/00* (2013.01)

(58) Field of Classification Search
CPC ...... G06Q 20/382; G06Q 20/40; G06Q 20/12; G06Q 20/227; G06Q 2220/00; G06Q 20/206; G06Q 20/401

USPC ......................................................... 705/64
See application file for complete search history.

(56) References Cited

U.S. PATENT DOCUMENTS

| | | | |
|---|---|---|---|
| 6,327,578 B1 | 12/2001 | Linehan | |
| 7,058,611 B2 | 6/2006 | Kranzley et al. | |
| 7,483,858 B2 | 1/2009 | Foran et al. | |
| 8,543,091 B2 * | 9/2013 | Mardikar | H04W 12/033 713/168 |
| 9,542,671 B2 | 1/2017 | Tien et al. | |
| 9,613,358 B1 | 4/2017 | Gardner | |
| 9,710,805 B2 | 7/2017 | Chaitanya | |
| 2014/0372308 A1 * | 12/2014 | Sheets | G06Q 20/40 705/44 |
| 2016/0012423 A1 * | 1/2016 | Chitilian | G06Q 20/3224 705/67 |
| 2016/0275475 A1 * | 9/2016 | Lin | G06Q 20/32 |

* cited by examiner

*Primary Examiner* — Mohammad A. Nilforoush
*Assistant Examiner* — Wodajo Getachew
(74) *Attorney, Agent, or Firm* — Moore & Van Allen PLLC; Thomas R. Parker, II

(57) ABSTRACT

Embodiments of the present invention provide a system for secure transfer of encrypted resources and asynchronous execution. In general, a user initiates an event with a merchant system and requests a secure resource transfer process associated with the event. Encrypted initial event details are transmitted through an asynchronous command form the merchant system to a computing device of the user, and resource information is identified at the computing device of the user. The computing device of the user then transmits the event details and the resource information to an event processing system for final execution.

16 Claims, 7 Drawing Sheets

SYSTEM FOR SECURE TRANSFER OF ENCRYPTED RESOURCES AND ASYNCHRONOUS EXECUTION

BACKGROUND

Conventional execution of resource transfers and execution of events related to the transfer of resources require the conveyance of sensitive resources from the owner of those resources to a merchant and other third parties. Additionally, these conventional resource transfers normally require synchronous execution, where a server initiating a resource transfer request pauses its execution until a response is returned from one or more authorizing or validating systems, where that response is based on the sensitive resources. Therefore, a system for secure transfer of encrypted resources that does not include the sensitive resources of the owner, and asynchronous execution of events associated with those resources that frees up server or computing device processing power of a merchant server is beneficial to both the security of customer resources and processing requirements of merchant servers.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for the secure transfer of encrypted resources and asynchronous execution. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving a request to utilize a secure event process for execution of an event between a user and a merchant, wherein the request is received from a computing device associated with the event. The system may then identify initial event data comprising at least an event amount, an event session code, merchant account information, and user contact information and encrypt the initial event data. The system may then transmit the encrypted initial event data on to a computing device of the user, and then decrypt the encrypted initial event data on the computing device of the user using a managing entity application stored on the computing device of the user. The system may further configure identifying, from the managing entity application stored on the computing device of the user, a compensation method of the user to be used for completion of the event. The system may then determine that the identified compensation method of the user is adequate to provide the transfer amount and transmit full event data comprising the initial event data and the identified compensation method to a managing entity server for execution of the event.

Identifying the initial event data may, in some embodiments, encompass receiving a transmission of the initial event data in a form of an asynchronous command from a merchant server associated with the merchant.

Additionally, the system's steps for identifying the compensation method may comprise identifying a plurality of available compensation methods associated with the user and prompting the computing device of the user to display selectable icons associated with each of the plurality of available compensation methods associated with the user and to request a user input of a desired compensation method of the plurality of available compensation methods to be used for the completion of the event. The system may then receive the user input of the desired compensation method in a form of a selection of a selectable icon of the displayed selectable icons, and assign the desired compensation method as the identified compensation method of the user to be used for completion of the event. In some such embodiments, the desired compensation method comprises one of a credit card associated with the user, a debit card associated with the user, a bank account associated with the user, or an instant short term loan associated with the user.

The system may further be configured to determine that the user is initiating the event between the merchant and the user via an online portal associated with the merchant and cause the online portal associated with the merchant to present a selectable icon that, when selected by the user, initiates the request to utilize the secure event process for the execution of the event.

In response to transmitting the full event data to the managing entity server to execute the event, the system may transmit, to a computing device associated with the merchant, a notification comprising at least a confirmation that the user is authorized to make the event, an indication that the event amount will be provided to the merchant, the event session code, the event amount, and a managing entity reference token associated with the event. Additionally, in response to transmitting the full event data to the managing entity server to execute the event, the system may transmit, to the computing device of the user, a notification comprising at least an indication that the event has been executed and the event amount.

The system's step of transmitting the encrypted initial event data to the computing device of the user may comprise transmitting an electronic mail message comprising the encrypted initial event data to an electronic mail address associated with the user and the computing device of the user, transmitting a short message service message comprising the encrypted initial event data to a short message service number associated with the user and the computing device of the user, or transmitting a multimedia messaging service message comprising the encrypted initial event data to a multimedia messaging service number associated with the user and the computing device of the user. In some embodiments, the system's step of transmitting the encrypted initial event data to the computing device of the user may comprise transmitting a near field communication message comprising the encrypted initial event data from a point of sale device of the merchant to the computing device of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
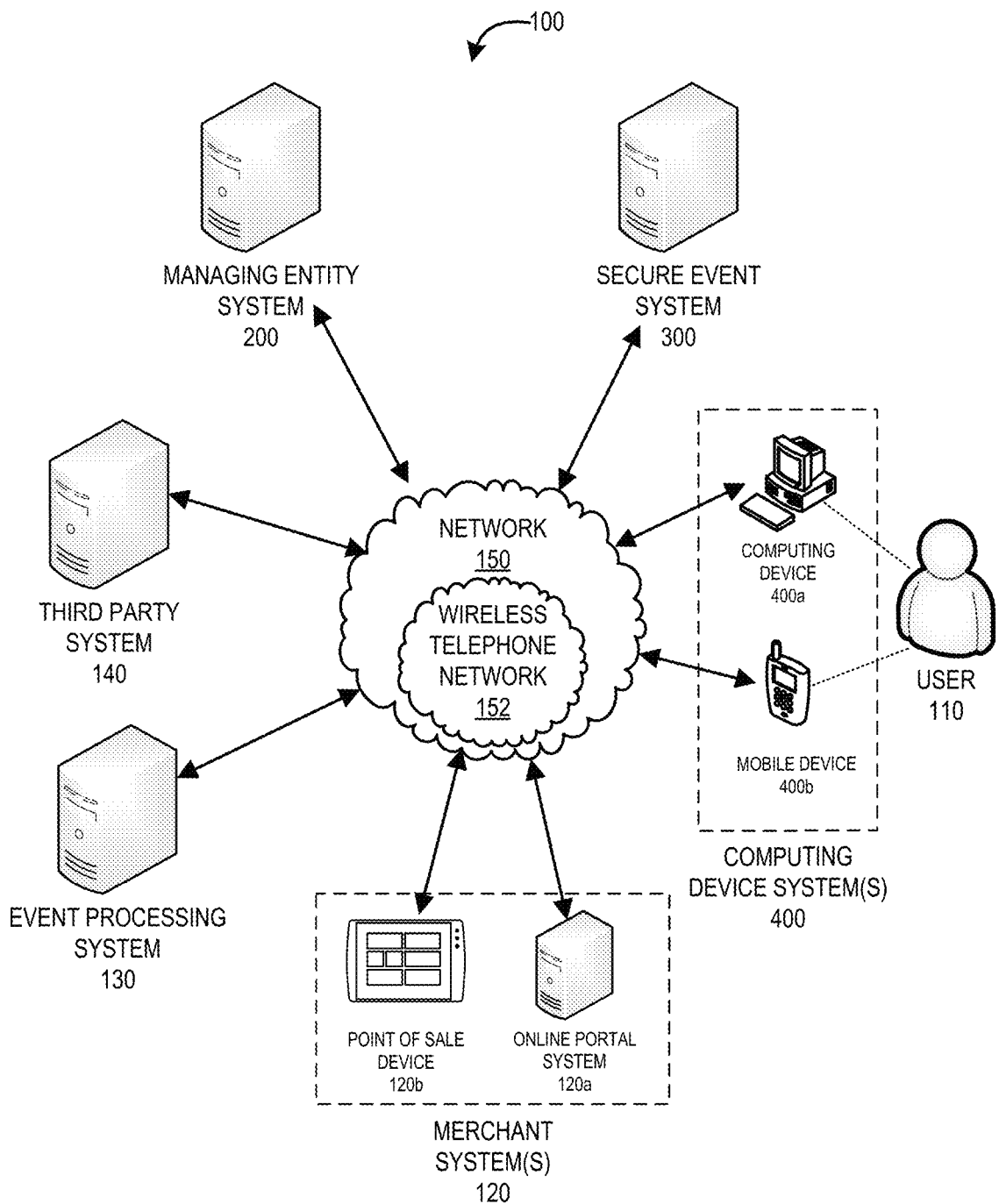
Figure 2:
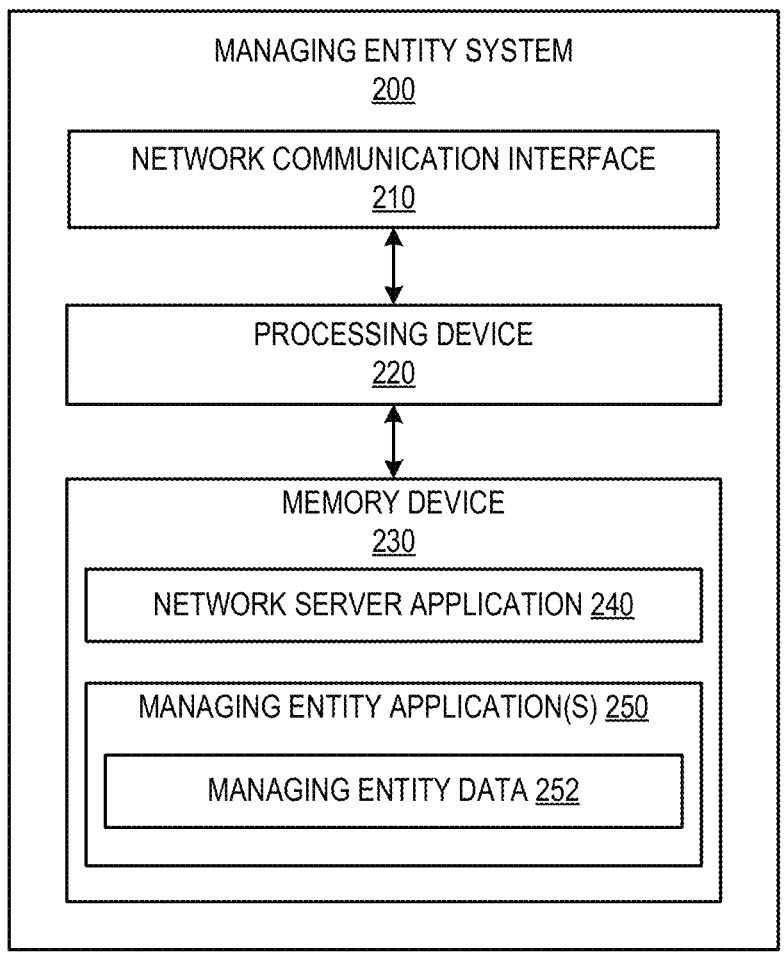
Figure 3:
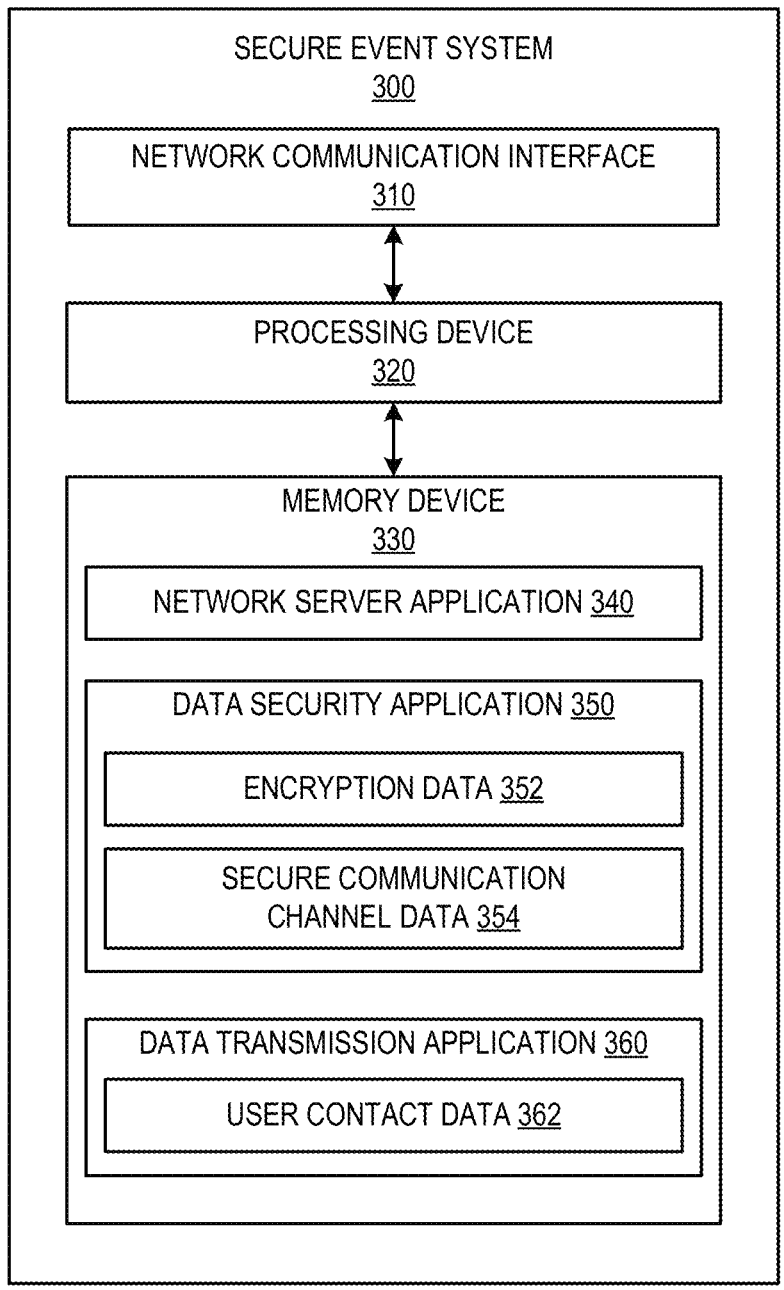
Figure 4:
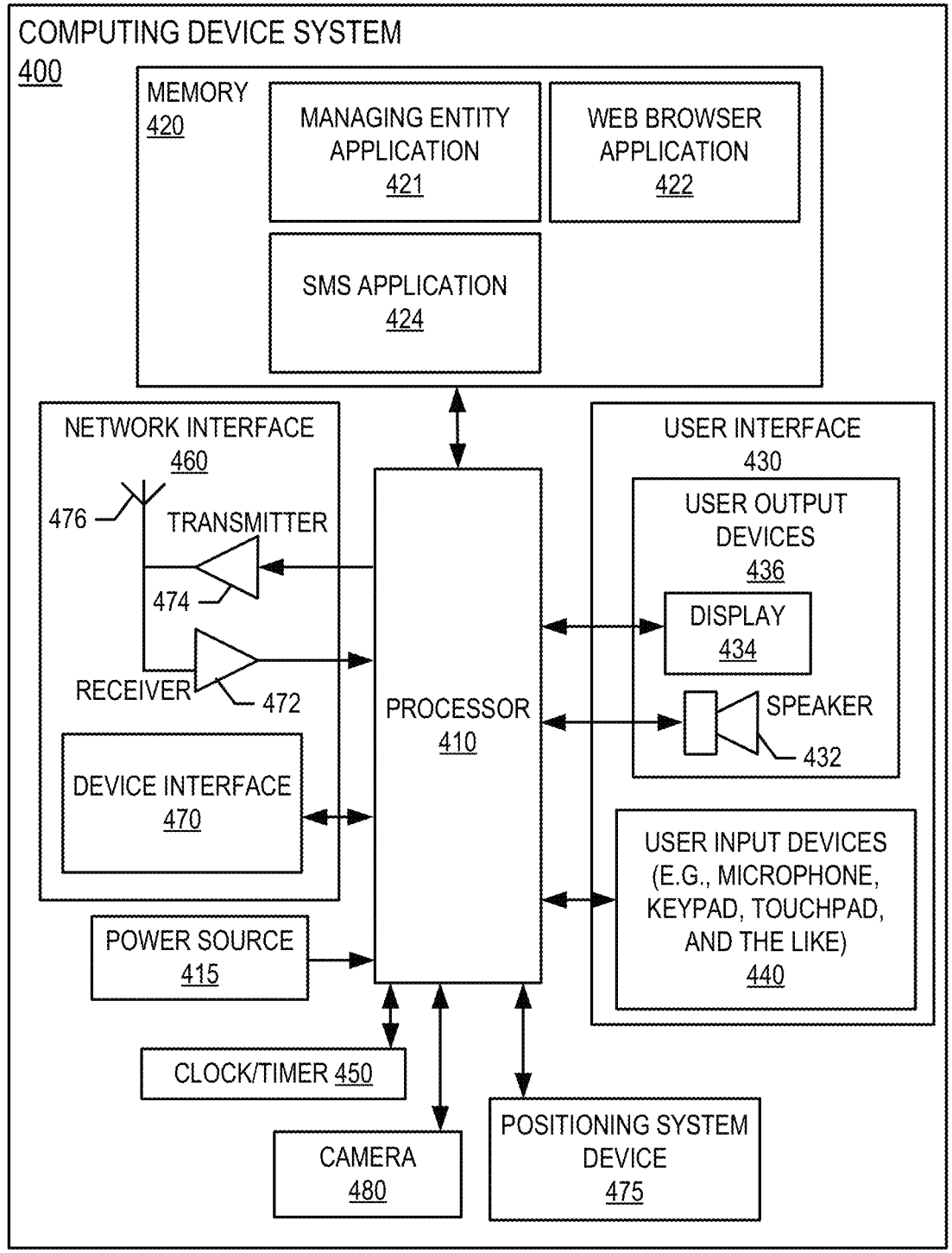
Figure 5:
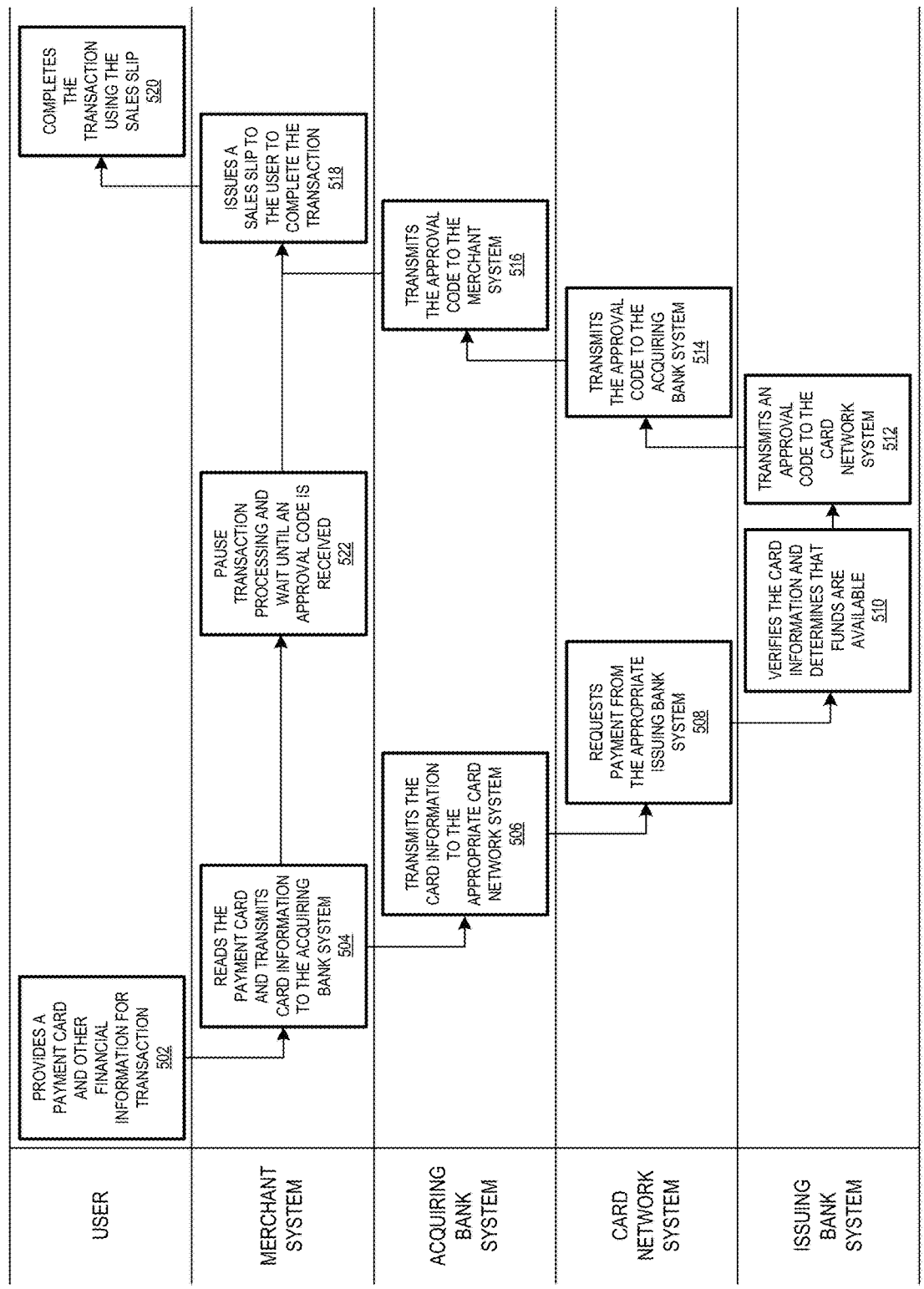
Figure 6:
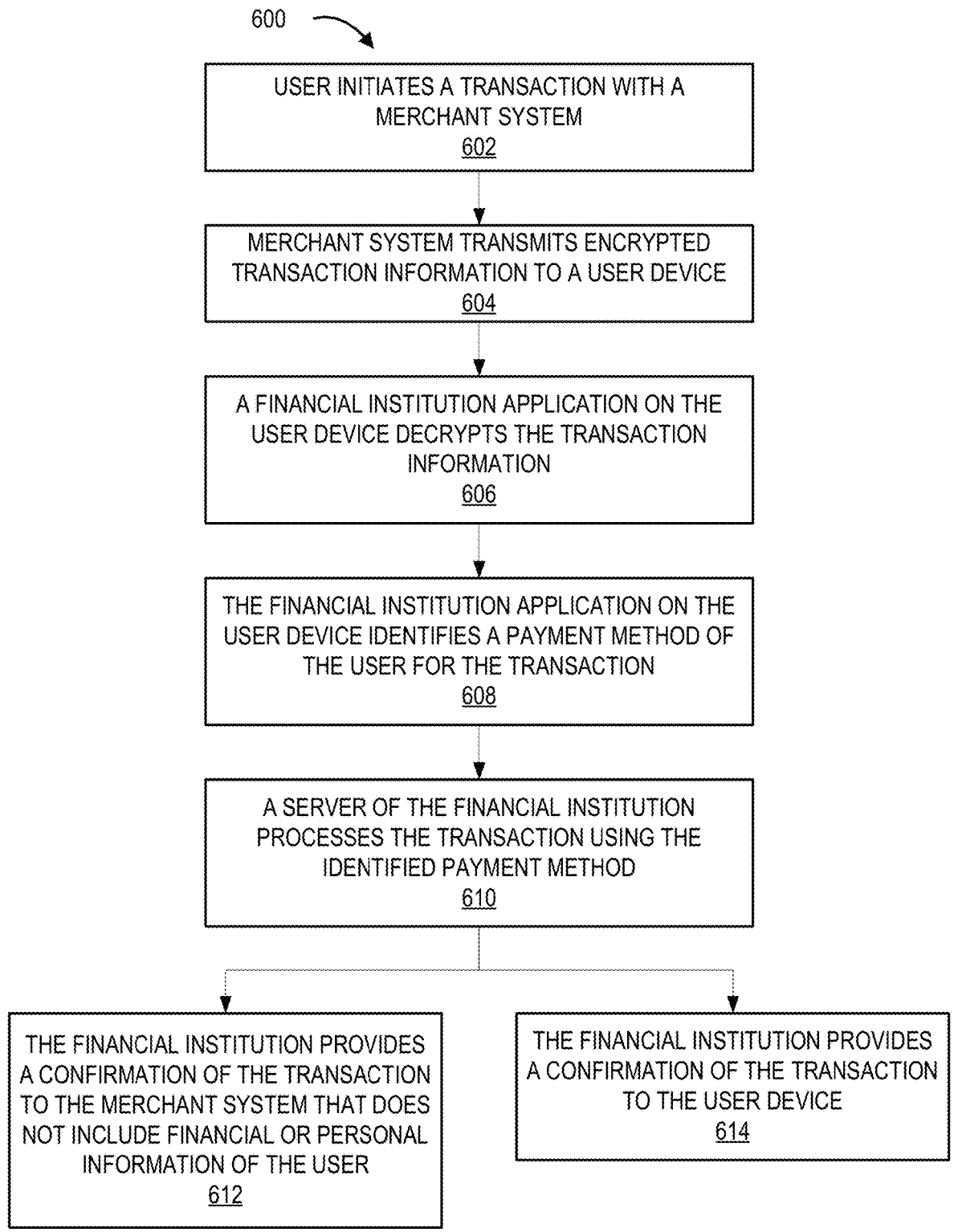
Figure 7:
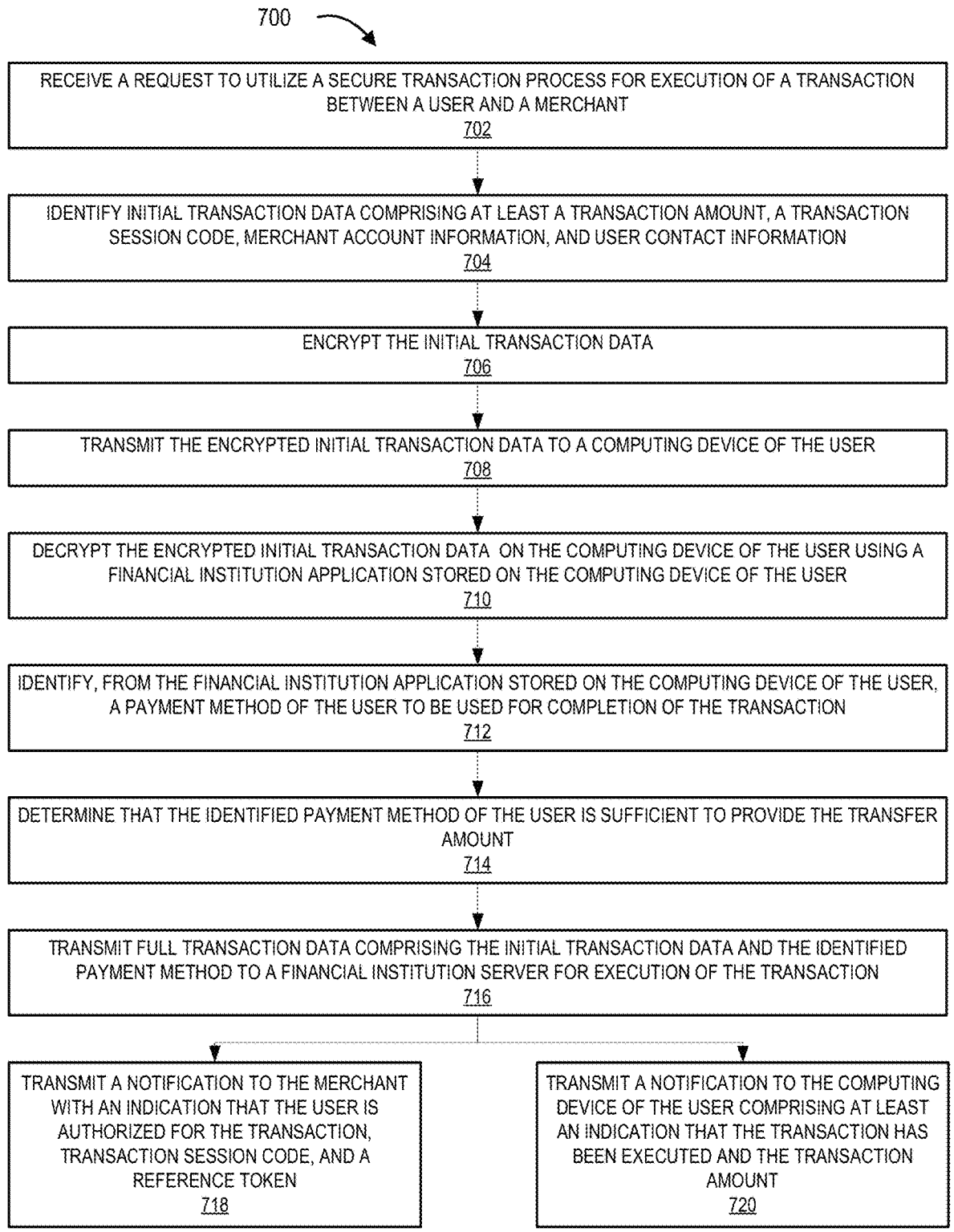

Having thus described embodiments of the invention in general terms, reference will now be made the accompanying drawings, wherein:

FIG. 1 provides a block diagram illustrating a system environment for secure transfer of encrypted resources and asynchronous execution, in accordance with an embodiment of the invention;

FIG. 2 provides a block diagram illustrating the managing entity system of FIG. 1, in accordance with an embodiment of the invention;

FIG. 3 provides a block diagram illustrating the secure event system of FIG. 1, in accordance with an embodiment of the invention;

FIG. 4 provides a block diagram illustrating the computing device system(s) of FIG. 1, in accordance with an embodiment of the invention;

FIG. 5 provides a block diagram illustrating a conventional system for the transfer of user financial information and the execution of a transaction based on the user financial information, in accordance with an embodiment of the invention;

FIG. 6 provides a flowchart illustrating a process for executing a transaction without the transfer of user financial information to the merchant or to a third party, in accordance with embodiments of the invention; and FIG. 7 provides a flowchart illustrating a more detailed process for executing a transaction without the transfer of user financial information to the merchant or to a third party, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for the execution of a transaction between a user and a merchant, where financial data of the user is not provided to the merchant or a third party, and where the merchant system is configured to perform asynchronous operations for the execution of the transaction, permitting the merchant system to continue performing other useful operations while a financial institution system handles the authorization and execution of the transaction. In general, a user initiates a transaction with a merchant, either through an online portal or with a point of sale or other computing device associated with a merchant location. As part of the transaction initiation, the user requests to execute the transaction through a secure manner that does not require that the user provide financial or overly sensitive user information to the merchant or any third party entity (excluding the financial institution from which the user has a financial account that will be used for the transaction). As part of this transaction initiation, the system (e.g., the merchant system, a system associated with the financial institution, or the like) may identify, or the user may provide, customer contact information in the form of a phone number, email address, or the like.

The system also identifies certain transaction information like the purchase price, the product or service that is part of the transaction, a transaction location, a period of time during which the transaction can occur, and the like. Importantly, the user has not provided any financial or personal information to the merchant system, apart from the contact information. The system then encrypts the initial transaction information and transmits the encrypted initial transaction information to a computing device associated with the user contact information (e.g., via an email message, a text message, or the like to a mobile device, laptop computer, or the like). Once the merchant system has transmitted the initial transaction information to the computing device of the user (either directly or via the financial institution system), the merchant system can move on to conduct other important operations and does not need to wait for an authorization or confirmation response from other systems to proceed its normal operations. This asynchronous nature of the merchant system's operations free the system up to perform more operations in the same amount of time that a system performing synchronous transaction operations would, because it does not pause its operations while a transaction is being processed, like the synchronous transaction system does.

A software application stored on the computing device of the user accesses the encrypted message, decrypts the message to identify the initial transaction information and determines a payment method and/or instrument of the user to be used to complete the transaction. This determination of the payment method or instrument may comprise identifying a pre-selected instrument for transactions executed in this manner. In other embodiments, the system may cause the application to prompt the user for user input of a selection of one of a plurality of available payment methods or instruments to complete the transaction.

Once the payment method or instrument has been identified, the system causes the application to submit full transaction information (e.g., the initial transaction information, an authentication and/or verification of the user and/or user account, and the selected payment method or instrument) to a transaction processing server of the financial institution. This submission may also be encrypted. Again, the financial information of the user, including security information like a personal identification number, biometric information, passcode information, and the like, still are not distributed to the merchant, the merchant system, or any entity other than the financial institution entity that originated the payment method and/or instrument and which already has records of the financial and security information of the user associated with the payment method.

The financial institution transaction processing server then executes the transaction and, if not already generated, generates a reference code or number for the particular transaction. This reference code, the initial transaction information, time stamp information, and any other reference-type information can then be transmitted to the merchant to confirm that the transaction has successfully occurred and give the merchant system a way to subsequently check transactions with the financial institution, all without providing sensitive financial or personal information of the user to the merchant or any other third party.

Similarly, the system can provide a confirmation of the completeness of the transaction to the computing device of the user, including the reference code, the transaction amount, and any other information that the user may find useful for its records.

FIG. 1 provides a block diagram illustrating a system environment 100 for secure transfer of encrypted resources and asynchronous execution, in accordance with an embodiment of the invention. As illustrated in FIG. 1, the system environment 100 includes a managing entity system 200, a secure event system 300, one or more computing device systems 400 (e.g., computing device 400a or mobile device 400b), one or more merchant systems 120 (e.g., online portal system 120a or point of sale device 120b), an event processing system 130, and one or more third party systems 140. One or more users 110 may be included in the system environment 100. In some embodiments, the user(s) 110 of the system environment 100 may be customers of a merchant associated with the merchant system(s) 120. These users 110 may also have one or more accounts (e.g., financial accounts) or financial payment instruments (e.g., credit cards, debit cards, and the like) with the managing entity system 200, or may otherwise have a relationship with payment methods associated with the managing entity system 200.

The managing entity system 200, the secure event system 300, the computing device system(s) 400, the merchant system(s) 120, the event processing system 130, and/or the third party system(s) 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The managing entity system 200 may be a system owned or otherwise controlled by a managing entity to perform one or more process steps described herein. In some embodiments, the managing entity is a financial institution. In general, the managing entity system 200 is configured to communicate information or instructions with the secure event system 300, the computing device system(s) 400, the merchant system(s) 120, the event processing system 130, and/or the third party system(s) 140 across the network 150. For example, the managing entity system 200 may cause the secure event system 300, computing device system(s) 400, merchant system(s) 120, event processing system 130, and/or the third party system(s) 140 to perform certain actions of the processes described herein. Of course, the managing entity system 200 may be configured to perform (or instruct other systems to perform) one or more other process steps described herein. The managing entity system 200 is described in more detail with respect to FIG. 2.

The secure event system 300 may be a system owned or controlled by the managing entity and/or a third party that specializes in data security, data encryption, secure communication between computing devices, merchant devices, and/or computing devices associated with the managing entity, or the like. In general, the secure event system 300 is configured to communicate information or instructions with the managing entity system 200, the computing device system(s) 400, the merchant system(s) 120, the event processing system 130, and/or the third party system(s) 140 across the network 150. For example, the secure event system 300 may encrypt initial transaction data and transmit the encrypted transaction data to computing device(s) associated with a user 110. Of course, the secure event system 300 may be configured to perform (or instruct other systems to perform) one or more other process steps described herein. The secure event system 300 is described in more detail with respect to FIG. 3.

The computing device system(s) 400 may be one or more systems owned or controlled by the managing entity and/or a third party that specializes in providing computing devices, mobile computing devices, and the like. These computing device systems may be owned or created by one or more third party entities, and may be owned or otherwise managed by the users (e.g., user 110) associated with this system environment 100. In general, the computing device system(s) 400 are configured to communicate information or instructions with the managing entity system 200, the secure event system 300, the merchant system(s) 120, the event processing system 130, and/or the third party system(s) 140 across the network 150. For example, the computing device system(s) 400 may receive encrypted transaction data in the form of messages, decrypt message data, prompt the associated user(s) 110 to provide payment method or instrument data, and transmit certain data to the event processing system 130. Of course, the computing device system(s) 400 may be configured to perform (or instruct other systems to perform) one or more other process steps described herein. A sample computing device system 400 is described in more detail with respect to FIG. 4.

The merchant system(s) 120 may be one or more computing devices, computing network systems, point of sale devices (e.g., the point of sale device 120b), online portal systems (e.g., the online portal system 120a), and the like. These merchant systems 120 are configured to receive information from the computing device systems 400 associated with the one or more users 110 and transmit initial transaction information with the computing device systems 400 of the users 110, the managing entity system 200, and/or the secure event system 300. The merchant systems 120 are also configured to initiate, provide information for the purpose of executing, and executing transactions between a merchant associated with the merchant system(s) 120 and the users 110. As such, the merchant systems 120 may a data encryption application, a message encryption application, and secure communication applications for communication between the computing device system(s) 400, the managing entity system 200, the secure event system 300, the event processing system 130, and/or the third party system(s) 140.

The event processing system 130 may be a system owned or controlled by the managing entity of the managing entity system 200 and/or a third party that specializes in financial transaction ("event") executions, the processing of transactions or other events, and the like. In some embodiments, at least a portion of the event processing system 130 is included within or otherwise managed by the managing entity system 200. In general the event processing system 130 is configured to communicate information or instructions with the managing entity system 200, the secure event system 300, the computing device system(s) 400, the merchant system(s) 120, and/or the third party system(s) 140.

The third party system(s) 140 may be any system that interacts with the system environment 100 to enable the other systems to operate in the manners described herein. For example, one third party system 140 may comprise a receiving financial institution entity system (e.g., a system associated with a financial institution that is associated with the merchant system(s) 120). Additionally or alternatively, one embodiment of the third party system 140 comprises a data security and communication security system that enables the managing entity system 200 and/or the merchant system(s) 120 to transmit transaction information (e.g., initial transaction information) to the computing device system(s) 400 associated with a user 110.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240 and one or more managing entity applications 250 that include managing entity data 252, and other computer-executable instructions or other data. The computer-executable program code of the network server application 240 and/or the managing entity application(s) 250, may instruct the processing device 220 to perform certain logic, data-processing, and data-storing functions of the managing entity system 200 described herein, as well as communication functions of the managing entity system 200.

The managing entity application(s) 250 may be configured to utilize managing entity data 252 stored within the managing entity system 200 and/or other data that is accessible to the managing entity system 200 within the network 150 to perform the one or more functions described herein. One example of a managing entity application 250 comprises a communication and/or managing application that is configured to perform the one or more actions (or cause other computing devices or systems described herein) described in the process 600 of FIG. 6 and/or process 700 of FIG. 7.

The network server application 240 and the managing entity application 250 are configured to invoke or use the managing entity data 252 and the like when communicating through the network communication interface 210 with the secure event system 300, the computing device system(s) 400, the merchant system(s) 120, the event processing system 130, and/or the third party system(s) 140.

The network communication interface 210 is a communication interface having one or more communication devices configured to communicate with one or more other devices on the network 150, such as the secure event system 300, the computing device system(s) 400, the merchant system(s) 120, the event processing system 130, the third party system(s) 140, and the like. The processing device 220 is configured to use the network communication interface 210 to transmit and/or receive data and/or commands to and/or from the other devices connected to the network 150.

FIG. 3 provides a block diagram illustrating the secure event system 300, in greater detail, in accordance with embodiments of the invention. As illustrated in FIG. 3, in one embodiment of the invention, the secure event system 300 includes one or more processing devices 320 operatively coupled to a network communication interface 310 and a memory device 330. In certain embodiments, the secure event system 300 is operated by a first entity, such as a financial institution, while in other embodiments, the secure event system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the secure event system 300 described herein. For example, in one embodiment of the secure event system 300, the memory device 330 includes, but is not limited to, a network server application 340, a data security application 350 which includes encryption data 352 and secure communication channel data 354, a data transmission application 360 which includes user contact data 362, and other computer-executable instructions or other data. The computer-executable program code of the network server application 340, the data security application 350, and/or the data transmission application 360 may instruct the processing device 320 to perform certain logic, data-processing, and data-storing functions of the secure event system 300 described herein, as well as communication functions of the secure event system 300.

In one embodiment, the data security application 350 includes encryption data 352 and secure communication channel data 354. The encryption data 352 may comprise encryption key data, and the like. The secure communication channel data 354 may include information for establishing and/or communicating across secure communication channels with computing devices associated with the one or more users.

In one embodiment, the data transmission application 360 includes user contact data 362. This user contact data 362 may include contact information for one or more users (e.g., the user 110).

The network server application 340, the data security application 350, and the data transmission application 360 are configured to invoke or use the encryption data 352, the secure communication channel data 354, the user contact data 362, and the like when communicating through the network communication interface 310 with the managing entity system 200, the computing device system(s) 400, the merchant system(s) 120, the event processing system 130, and/or the third party system(s) 140.

FIG. 4 provides a block diagram illustrating a computing device system 400 of FIG. 1 in more detail, in accordance with embodiments of the invention. In one embodiment of the invention, the computing device system 400 is a mobile telephone. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless telephone network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices. The positioning system device 475 may play a crucial role in transmitting location information associated with the computing device system 400 for determining when the computing device system 400 is in at or is in close proximity to a merchant system 120.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422 and/or a managing entity application 421 (or any other application provided by the managing entity system 200). These applications also typically instructions to a graphical user interface (GUI) on the display 430 that allows the user 110 to interact with the computing device system 400, the managing entity system 200, and/or other devices or systems. In one embodiment of the invention, when the user 110 decides to enroll in a managing entity application 421 program, the user 110 downloads, is assigned, or otherwise obtains the managing entity application 421 from the managing entity system 200, or from a distinct application server (e.g., from the secure event system 300, a merchant system 120, or a third party system 140). In other embodiments of the invention, the user 110 interacts with the managing entity system 200 or the merchant system 120 via the web browser application 422 in addition to, or instead of, the managing entity application 421.

The memory 420 of the computing device system 400 may comprise a Short Message Service (SMS) application 423 configured to send, receive, and store data, information, communications, alerts, and the like via the wireless telephone network 152. In some embodiments, the memory 420 may include a multimedia messaging service (MMS) application, a Bluetooth messaging or communication application, a dedicated electronic mail application, a near-field communication application, or the like.

The managing entity application 421 may be configured to receive encrypted initial transaction data via messages, extract messages, decrypt messages, prompt the user to provide a desired payment instrument or method, identify a desired payment instrument or method, transmit transaction data including payment method to a transaction processing system, and the like.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein. For example, the memory 420 may include such data as financial institution data, financial account data, available payment method data, available payment instrument data, preferred payment data, and the like.

Referring now to FIG. 5, a flowchart is provided as background to illustrate conventional steps for processing a payment transaction between a user and a merchant system. To initiate the transaction with the merchant, the user provides a payment card for the transaction to the merchant system, as shown in block 502. The user may also be prompted to provide, and subsequently provide, additional information associated with the payment card (or another financial instrument) that may enable the transaction to successfully process (e.g., a personal identification number, a zip code, an answer to a security question, or the like). The merchant system then reads the payment card to obtain the financial information of the user and transmits the card information to the acquiring bank system, as noted in block 504.

Block 506 illustrates that the acquiring bank system then transmits the card information to the appropriate card network system that is associated with the payment card of the user. The card network system requests payment from the appropriate issuing bank system that is associated with the user's account, as shown in block 508.

The issuing bank system then verifies the card information and determines that the funds are available in block 510. Next, the issuing bank system proceeds to block 512 and transmits an approval code to the card network system.

The card network system, as shown in block 514, then transmits the approval code up to the acquiring bank system, and the acquiring bank system, as shown in block 516, transmits the approval code to the merchant system. The merchant system then issues a sales slip to the user to complete the transaction as shown in block 518. Of note, once the merchant system transmits the card information to the acquiring bank system in block 504, the merchant system will pause its transaction process and wait for a response of the approval code before continuing the transaction with the user and subsequent transactions with other users, as shown in block 522. Finally, the user completes the transaction with the merchant by using the sales slip, as shown in block 520.

This conventional transaction execution process 500 requires that the merchant system pause its processing operations for the amount of time between its request for an approval of the requested transaction to when the approval is received. As such, the merchant system is slowed down and generally lacks efficiency because its processing devices cannot continuously execute operations (e.g., additional transactions, transactions with third parties, merchant-side operations like providing features for a web portal, and the like). If the merchant system was not required to pause its processing operations until the approval code is received, then the merchant system could utilize its computing resources in a more beneficial and efficient manner.

Referring now to FIG. 6, a flowchart is provided to illustrate one embodiment of a process 600 for the secure transfer of encrypted financial and transaction information and asynchronous execution of transactions, in accordance with embodiments of the invention. In some embodiments, the process 600 may include block 602, where the user initiates a transaction with a merchant system. As noted above, the user may be a customer of a managing entity system, a financial institution system (e.g., an issuing bank system), a card network system, or the like. The merchant system is associated with a merchant with whom the user is initiating a transaction of goods or services with payment. This initiation of a transaction may occur via an online portal owned, managed, or otherwise associated with the merchant. Additionally or alternatively, the initiation of the transaction may occur via a point of sale device or other computing device at a physical location of the merchant (e.g., within a store owned by the merchant).

In general, the initiation of the transaction includes a request for the user to purchase goods or services of the merchant for a transaction amount. The user and/or the merchant system may generate a set of transaction information including, but not limited to, information about the goods or services, the payment amount, timing of the transaction, merchant account information (e.g., a financial account to which the payment amount will be submitted), and the like.

Importantly, this transaction information does not include any financial information of the user. The user is not providing a payment vehicle (e.g., a credit card, debit card, check, or the like) that includes information that could be misappropriated to the detriment of the user. Additionally, the user is not providing any biometric information (e.g., fingerprint, retinal scan, or the like), password or passcode information, answers to security questions, customer numbers, or the like. This additional personal information of the user could also be misappropriated to the detriment of the user, especially when identified along with any financial information of the user.

The only personal information of the user that may be provided is contact information of the user, which may include a telephone number of the user, an email address of the user, a near-field communication link authorization of the user, or the like. This user contact information, if misappropriated would not be as detrimental to the user as the other personal information or financial information of the user, as the information may already be publicly available, can be changed at any time, and does not permit malfeasants to gain access to financial accounts, financial instruments, or the like.

Next, as shown in block 604, the merchant system transmits encrypted transaction information to a user device. While process 600 illustrates how the merchant system may transmit the encrypted information to the user device, it should be known that a managing entity system (e.g., a financial institution system that is associated with the user and/or the merchant) may encrypt and/or transmit the encrypted information to the user device. By encrypting the transaction information, the system further protects any information that the user and/or merchant system would prefer to keep secure.

The encrypted transaction may be transferred as a message to the user device. For example, the message may be sent as an SMS message, an MMS message, an electronic mail message, a near field communication message (e.g., via an NFC chip associated with the merchant system and/or the user device, via an RFID connection, a Bluetooth connection, a Wi-Fi connection, or the like). A software application provided by, managed by, or otherwise associated with the financial institution (i.e., a financial institution application) may be stored on the user device, and the transmission of the encrypted transaction information via the message may trigger the application to identify the occurrence of a new transaction request and execute certain steps.

For example, as shown at block 606, the financial institution application stored on the user device then decrypts the transaction information. By decrypting the transaction information, the financial institution application is able to identify the transaction information, including the purchase price, the goods or services being purchased, timing information regarding the transaction, an account of the merchant to which a payment should be made, and/or the like. The only information that is missing to initiate steps for transaction processing is which payment instrument and/or payment method the user will use for this transaction.

Therefore, the process 600 may include block 608, where the financial institution application on the user device identifies a payment method of the user for the transaction. Because the user did not provide a payment method or instrument when initiating the transaction with the merchant system, the financial institution application on the user device must rely on its internal memory to identify a preferred financial instrument or payment method of the user, to list available payment methods of the user, or to request user input of a payment method from the user (e.g., via a user interface of the user device). In the latter embodiment, the financial institution application may already have access to a list of approved financial accounts and/or financial instruments that the user has with the financial institution. The fact that the financial institution application has this financial information is not an issue for the user, as the financial accounts and financial instruments are managed by that financial institution, so the information would already be known by them. No new parties would be receiving the financial information of the user through this process. Ultimately, the financial institution application on the user device identifies, and/or the user selects, a payment method for the transaction.

At this point in the process 600, the financial institution has all information needed to execute the transaction: the transaction amount, the financial account of the merchant system that should be paid, and the payment method of the user that will be used to conduct the transaction. Of course other transaction information, including a transaction number or code, timing information of the transaction, identification information of the merchant and/or the goods or services being transacted, and the like, may be known to the financial institution at this point in time, and could be used to execute the transaction.

Moving to block 610, a server of the financial institution then processes the transaction using the identified payment method. Of note, since the merchant server transmitted the initial transaction information to the user device (or to the merchant system, to send to the merchant device), the merchant server has not been required to pause its operations, to wait for an approval code, or any other requirement that reduces the efficiency of its processing devices. Instead, it has been free to execute other transactions, to transmit other initial transaction information to other user devices, and the like. This process 600 does not need any other executions from the merchant system to execute the transaction, and therefore the transaction is executed securely by the financial institution's transaction processing system.

Once the transaction has been processed or otherwise executed, the financial institution then provides a confirmation of the transaction to the merchant system that does not include financial or personal information of the user, as shown in block 612. As this process 600 has not required the dissemination of financial information regarding the user (or the financial accounts associated with the user), or the personal information of the user (including passcode information, biometric information, and the like, with the exception of the user contact information), the process 600 continues to protect the financial and personal information of the user by not providing it to the merchant system, even after the transaction is processed. Instead, the system may provide a transaction code to the merchant system that references the transaction on the financial institution's system. This way, if the merchant has a question or issue with the transaction, the merchant can provide this transaction reference code to the financial institution, and the financial institution can review the additional transaction details that include the financial information of the user.

Generally, the confirmation of the transaction will include information about the transaction amount, the goods or services exchanged, the timing of the transaction, a transaction number associated with the merchant's records, and the session code or other transaction reference code of the financial institution. Again, the merchant system has not been required to wait for this transaction to be approved before moving forward with other operations by its processing devices.

Additionally, once the transaction has been processed or otherwise executed, the financial institution provides a confirmation of the transaction to the user device, as shown in block 614. Similarly to the merchant confirmation, the user confirmation may include the basic transaction information, but may also include information about the payment method used, and any other useful information like a remaining balance for that payment method, coupons or discounts that the user could use in the future, based on this transaction, and the like.

Referring now to FIG. 7, a flowchart is provided to illustrate one particular embodiment of a process 700 for the secure transfer of encrypted transaction information and asynchronous transaction execution, in accordance with embodiments of the invention. In some embodiments, this process 700 (or variations of this process 700) may be performed by a managing entity system (e.g., the managing entity system 200 of FIG. 1), a secure event system or other secure transaction system (e.g., the secure event system 300 of FIG. 1), one or more computing devices (e.g., the computing device 400a and/or the mobile device 400b of FIG. 1), one or more merchant systems (e.g., the online portal system 120a and/or the point of sale device 120b of FIG. 1), an event processing system or other transaction processing system (e.g., the event processing system 130 of FIG. 1), and/or one or more third party systems (e.g., the third party system(s) 140 of FIG. 1).

The process 700 may begin with block 702, where the system receives a request to utilize a secure transaction process for execution of a transaction between a user and a merchant. This request may be received from a computing device associated with the transaction. This computing device that is associated with the transaction may be a computing device of the user (e.g., a mobile phone, personal computer, laptop computer, or the like) or a computing device of a merchant system (e.g., a point of sale device, an electronic kiosk device, an automated teller machine, or the like).

In embodiments where the user is initiating a transaction using a computing device of the user, via an online portal of the merchant, the system may determine that the user is initiating the transaction and cause the online portal associated with the merchant to present a selectable icon that, when selected by the user, initiates the request to utilize the secure transaction process for the execution of the transaction.

In embodiments where the user is initiating the transaction at a computing device of the merchant (e.g., a point of sale device), the system may cause the point of sale device to display a selectable icon or button that the user may select to request the use of the secure transaction with the merchant.

In some embodiments, the process 700 includes block 704, where the system identifies initial transaction data comprising at least a transaction amount, a transaction session code, merchant account information, and user contact information. As the user is entering into a transaction with the merchant for goods and/or services, the initial transaction data may contain at least the information that is required for the transaction: transaction amount, merchant identification code (or an account number that should receive a transaction payment from the user, and timing of the transaction. Of course, other transaction information may be included in the initial transaction data including, but not limited to, identifying information for the goods and/or services that are being purchased by the user, tax information, shipping information, discount information, merchant-generated transaction identifier data, geographic information about the merchant, other information about the merchant that may be useful in recording the transaction, and the like.

Importantly, and as described above, the initial transaction data does not include any financial information associated with the user including financial instrument information (e.g., credit card information, debit card information, financial account information, and the like), security information associated with the user (e.g., user passcode information, personal identification number information of the user, biometric information of the user, or the like). This process 700 does not require that the user provide any of this information to any entity or system other than the financial institution with which the payment instruments or methods of the user are managed, or with which the user already has provided the security information associated with the financial information.

By not requiring the user to provide financial information, this process 700 protects the sensitive data from misappropriation by the merchant system and/or third parties that intervene or attempt to intercept the financial information. Additionally, personal identification numbers, biometric information, passcode information, and other information that would otherwise aide malfeasants in obtaining access to the financial information of the user are not revealed as part of this type of transaction. Therefore, this process 700 is an improvement upon conventional methods of executing transactions that normally require the transfer of financial and security information to at least the merchant system, which opens the financial and security information up to misappropriation.

In online portal embodiments, the system may identify the device accessing the online portal (i.e., the user device), and identity known contact information for that device and/or the user associated with the device.

In some embodiments, the system may prompt the user to provide the contact information (e.g., phone number, email address, or the like) via the online portal, via the computing device of the merchant, or the like. The user may alternatively be prompted to transmit an initial message to a computing device associated with the merchant system (e.g., transmit a text message to the merchant system with a confirmation code generated to be associated with the transaction), or the like. In this way, the user may be able to avoid providing any personal information or financial information to the merchant system, because the contact information of the user would be transmitted directly to a managing entity system (e.g., the system associated with the financial institution entity). This transmission of user contact information (or just a message from a contact number or address) from the user device may include a session code, transaction code, or other identification code that allows the managing entity system to identify which transaction the user is associated with, and therefore which initial transaction data (received from the merchant system) to associate with the user.

In some embodiments, identifying the transaction data comprises receiving a transmission of the initial transaction data in a form of an asynchronous command from a merchant server associated with the merchant. As noted above with respect to FIG. 5, conventional transaction processes involve the merchant server receiving the financial information of the user, sending the financial information of the user and the transaction information to one or more third parties, and pausing its processing operations until an approval code is received (i.e., a "synchronous" command). During this pause in processing operations, the merchant server is not performing any useful operations and therefore reduces the efficiency of the processing environment for the merchant server. Because this process 700 does not require that the merchant server waste its time and resources by waiting for approval codes, the merchant server is able to transmit the initial transaction data to a server associated with a managing entity system and immediately move on to perform the next operation in its queue (i.e., an "asynchronous" command). Of course, in some embodiments, the merchant system transmits the initial transaction data to the computing device of the user instead of to the managing entity system (e.g., at block 708), but the same concept applies: the merchant system is able to transmit the data in an asynchronous manner such that it can continue operations without pausing operations until an approval code is received.

Additionally, in some embodiments, the process 700 includes block 706, where the system encrypts the initial transaction data. By encrypting the initial transaction data, the system is further protecting any financial, personal, transaction, and other information of the user and/or the merchant. In embodiments where the merchant system has transmitted the initial transaction data to a managing entity system (e.g., the managing financial institution system), the managing entity system performs the The process 700 may also include block 708, where the system transmits the encrypted initial transaction data to a computing device of the user. This transmission is made based on the provided or identified contact information of the user (e.g., a phone number, an electronic mail address, a Bluetooth connection, or the like). In some embodiment, the system causes the merchant system to transmit the encrypted initial transaction data to the computing device of the user. In other embodiments, the initial transaction data has already been transmitted to the managing entity associated with this system in process 700, and therefore the managing entity system is configured to transmit the initial transaction data directly to the computing device of the user.

The system may transmit (or cause another system to transmit) the encrypted initial transaction data to the computing device of the user in several ways. One example technique is to transmit an electronic mail message comprising the encrypted initial transaction data to an electronic mail address associated with the user and the computing device of the user. In another example, the system may transmit a short message service message comprising the encrypted initial transaction data to a short message service number associated with the user and the computing device of the user. Furthermore, the system may transmit a multimedia messaging service message comprising the encrypted initial transaction data to a multimedia messaging service number associated with the user and the computing device of the user. The system may also cause the merchant system to transmit a near field communication message comprising the encrypted initial transaction data from a point of sale device (or other merchant device) to the computing device of the user. Of course, the system may utilize other techniques for transmitting the encrypted initial transaction data to the computing device of the user (e.g., by storing the initial transaction data in a server that is accessible by a managing entity application or financial institution application stored on the computing device of the user, and transmitting a notification to the computing device of the user to retrieve the initial transaction data form the server).

In some embodiments, the process 700 includes block 710, where the system decrypts the encrypted initial transaction data on the computing device of the user using a financial institution application stored on the computing device of the user. The information or keys for encryption and/or decryption information may be stored within the financial institution application stored on the computing device of the user. Therefore, when the encrypted initial transaction data is received, financial institution application extracts the encrypted initial transaction data and decrypts the data using a stored or known key. For example, the financial institution application may determine that encrypted initial transaction data has been received via an SMS message (e.g., by identifying a triggering code in the received message), extract the encrypted initial transaction data from the SMS message, and use a known key to decrypt the initial transaction data. The initial transaction data is then readable by the financial institution application.

Additionally, in some embodiments, the process 700 includes block 712, where the system identifies, from the financial institution application stored on the computing device of the user, a payment method of the user to be used for completion of the transaction. The payment method may be any financial instrument, financial account, payment method, or the like that a user can utilize to pay for a product or service of the merchant to complete the transaction. Examples of payment methods include, but are not limited to, credit cards, debit cards, bank accounts, instant short term loans, checks, and wire transfer.

In some embodiments, the step of identifying the payment method comprises identifying a plurality of available payment methods associated with the user (e.g., as stored within the financial institution application stored on the computing device of the user and/or by searching for financial accounts associated with the user, as stored within an internal database of the financial institution. The system may then prompt the computing device of the user to display selectable icons associated with each of the plurality of available payment methods associated with the user and to request a user input of desired payment methods associated with the user and to request a user input of a desired payment method of the plurality of payment methods. Next, the system may receive the user input of the desired payment method in a form of a selection of a selectable icon of the displayed selectable icons. The system may then assign the desired payment method as the identified payment method of the user to be used for completion of the transaction.

In other embodiments, the user may select or enter a desired payment method or payment instrument ahead of time. In such embodiments, the payment method is predetermined and the financial institution application does not need to be prompted to request the payment method, as the predetermined payment method is automatically selected.

Because the transaction technique described in this process 700 does not necessarily need to be executed within a very short period of time, additional payment vehicles or methods can be utilized by the user to execute the transaction. As such, in one embodiment, the system may notify the user, via the computing device of the user, that the user is pre-authorized to utilize a short term loan for at least the transaction amount. If accepted, the financial institution entity associated with the financial institution system would then provide the payment amount to the merchant system and set up the short term loan provisions with the user.

The process 700 may include block 714, where the system determines that the identified payment method of the user is adequate to provide the transfer amount. The system may also perform one or more other authentication, authorization, or verification steps with the user and/or the computing device associated with the user to ensure that the user has authorized the payment, that the payment method or payment instrument is adequately prepared to cover the transaction amount, and the like. In some embodiments, the system may require that the user provide log-in credentials, biometric information, or the like to permit the financial institution application stored on the computing device of the user to perform one or more of the steps of this process 700.

With the payment method and/or payment instrument identified, the system is prepared to execute the transaction between the user and the merchant. Therefore the process 700 may include block 716, where the system transmits full transaction data comprising the initial transaction data and the identified payment method to a financial institution server (e.g., the event processing system 130 of FIG. 1) for execution of the transaction. In some embodiments, the system may encrypt the transaction information and transmit the encrypted transaction information to the financial institution server or other transaction execution system.

Once again, no third party systems have received the financial or personal information of the user, as the transaction is being processed within the financial institution system that already has access to all financial and personal information that is included in the transaction information for the processing of the transaction.

Once the transaction data has been authorized and transmitted to the financial institution server for execution of the transaction, the system may proceed to block 718, where the system transmits a notification to the merchant with indications that the user is authorized for the transaction, a transaction session code, and a transaction reference token. Of course, other information may be provided to the merchant system including, but not limited to, transaction reference codes (either generated by the merchant system or the financial institution system), time-based information (e.g., a transaction initiation timestamp, a transaction execution timestamp, or the like). Again, no financial or personal data of the user is being provided to the merchant or any third party through this process 700.

Finally, the process 700 may continue to block 720, where the system may transmit a notification to the computing device of the user comprising at least an indication that the transaction has been executed and an indication of the transaction amount. Of course, other information may be provided to the computing device of the user including, but not limited to, transaction reference codes, transaction time-based information, offers or coupons for future transactions with the merchant, and the like.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for secure transfer of encrypted resources and asynchronous execution, the system comprising:
   a merchant system comprising:
      a first memory device with first computer-readable program code stored thereon; and
      a first processor operatively coupled to the first memory device, wherein the first processor executes the first computer-readable program code to perform the steps of:
         receiving a request to utilize a secure event process for execution of an event between a user and a merchant, wherein the request is received from a computing device associated with the event;
         identifying initial event data comprising at least an event amount, an event session code, merchant account information, and user contact information;
         encrypting the initial event data; and
         transmitting the encrypted initial event data to a computing device of the user;
   the computing device of the user comprising:
      a second memory storing a financial institution application and second computer-readable program code; and
      a second processor operatively coupled to the second memory that executes the second computer-readable program code to perform the steps of:
         receiving, by the financial institution application, the initial event data identifying a triggering code;
         decrypting, on the financial institution application using a decryption key stored on the computing device of the user, the transmitted encrypted initial event data;
         identifying, from the financial institution application, a compensation method of the user to be used for execution of the event;
         determining, using the financial institution application, that the identified compensation method of the user is authorized to provide the transfer amount;
         transmitting, using the financial institution application, full event data to a financial institution server for execution of the event, wherein the full event data comprises the initial event data and the identified compensation method;
   the financial institution server comprising:
      a third memory storing third computer-readable program code; and
      a third processor operatively coupled to the third memory that executes the third computer-readable program code to perform the steps of:
         receiving the full event data at the financial institution server to execute the event;
         transmitting, to the merchant system, a notification comprising at least a confirmation that the user is authorized to make the event, an indication that the event amount will be provided to the merchant, the event session code, the event amount, and a managing entity reference token associated with the event.

2. The system of claim 1, wherein identifying the compensation method comprises:
   identifying, using the financial institution application, a plurality of available compensation methods associated with the user;
   prompting, using the financial institution application, via a user output device of the user, by displaying selectable icons associated with each of the plurality of available compensation methods associated with the user and requesting a user input of selecting compensation method of the plurality of available compensation methods to be used for the completion of the event;
   receiving, using the financial institution application, via the user output device of the user, input selecting the compensation method, wherein the user input is in a form of a selection of a selectable icon of the displayed selectable icons; and
   assigning, using the financial institution application, the selected compensation method as the identified compensation method of the user to be used for completion of the event.

3. The system of claim 2, wherein the selected compensation method comprises one of a credit card associated with the user, a debit card associated with the user, a bank account associated with the user, or an instant short-term loan associated with the user.

4. The system of claim 1, wherein the third processor of the financial institution server further executes the third computer-readable program code to perform the step:
   transmitting, to the merchant system, a selectable icon for presentation to the user that, when selected by the user, initiates the request to utilize the secure transaction process.

5. The system of claim 1, wherein the third processor of the financial institution server further executes the third computer-readable program code to perform the step of:

in response to receiving the full event data at the financial institution server to execute the event,
transmitting, to the computing device of the user, a notification comprising at least an indication that the event has been executed and the event amount.

6. The system of claim 1, wherein transmitting encrypted initial event data to the computing device of the user comprises at least one of:
   transmitting an electronic mail message comprising the encrypted initial event data to an electronic mail address associated with the user and the computing device of the user;
   transmitting a short message service message comprising the encrypted initial event data to a short message service number associated with the user and the computing device of the user;
   transmitting a multimedia messaging service message comprising the encrypted initial event data to a multimedia messaging service number associated with the user and the computing device of the user; and
   transmitting a near field communication message comprising the encrypted initial event data from a point of sale device of the merchant to the computing device of the user.

7. The system of claim 1, wherein the computing device associated with the event comprises the computing device of the user or a computing device associated with the merchant.

8. A computer program product for secure transfer of encrypted resources and asynchronous execution, the computer program product comprising at least one first non-transitory computer readable medium comprising: one or more computer-executable instructions, that when executed by one or more processors of a merchant system, perform the steps of:
   receiving a request to utilize a secure transaction process for execution of a transaction between a user and a merchant, wherein the request is received from a computing device associated with the transaction, wherein the request comprise an initial transaction data comprising at least a transaction amount, a transaction session code, merchant account information, and user contact information;
   encrypting the initial transaction data; and
   transmitting the encrypted initial transaction data to a computing device of the user;
   the computer program product further comprising a second non-transitory computer readable medium comprising: a financial institution application and one or more computer-executable instructions, that when executed by one or more processors of the computing device of the user perform the steps of:
   receiving, by the financial institution application, the initial event data identifying a triggering code;
   decrypting, on the financial institution application using a decryption key stored on the computing device of the user, the transmitted encrypted initial transaction data;
   identifying, from the financial institution application, a payment method of the user to be used for execution of the transaction;
   determining, using the financial institution application, that the identified payment method of the user is authorized to provide the transfer amount; and
   transmitting, using the financial institution application, full transaction data to a financial institution server for execution of the event, wherein the full event data comprises the initial event data and the identified payment method;

the computer program product further comprising a third non-transitory computer readable medium comprising: one or more computer-executable instructions, that when executed by one or more processor of the financial institution server perform the steps of:
   in response to transmitting receiving the full transaction data at the financial institution server to execute the transaction;
   transmitting, to the merchant system, a notification comprising at least a confirmation that the user is authorized to make the transaction, an indication that the transaction amount will be provided to the merchant, the transaction session code, the transaction amount, and a financial institution reference token associated with the transaction.

9. The computer program product of claim 8, wherein identifying the payment method comprises:
   identifying, using the financial institution application, a plurality of available payment methods associated with the user;
   prompting, using the financial institution application, via a user output device of the user, by displaying selectable icons associated with each of the plurality of available payment methods associated with the user and requesting a user input of selecting the payment method of the plurality of available payment methods to be used for completion of the transaction;
   receiving, using the financial institution application, the user input selecting the payment method via the user output device of the user, wherein the user input is in a form of a selection of a selectable icon of the displayed selectable icons; and
   assigning, using the financial institution application, the selected payment method as the identified payment method of the user to be used for completion of the transaction.

10. The computer program product of claim 9, wherein the selected payment method comprises one of a credit card associated with the user, a debit card associated with the user, a bank account associated with the user, or an instant short-term loan associated with the user.

11. The computer program product of claim 8, further comprising computer-executable instructions, that when executed by the one or more processors of the financial institution server, perform the steps of:
   transmitting, to the merchant system, a selectable icon for presentation to the user that, when selected by the user, initiates the request to utilize the secure transaction process.

12. The computer program product of claim 8, wherein the third computer readable instructions are further executed by the one or more processor of the financial institution server to perform the step of:
   in response to receiving the full transaction data at the financial institution server to execute the transaction,
   transmitting, to the computing device of the user, a notification comprising at least an indication that the transaction has been executed and the transaction amount.

13. The computer program product of claim 8, wherein transmitting the encrypted initial transaction data to the computing device of the user comprises at least one of:
   transmitting an electronic mail message comprising the encrypted initial transaction data to an electronic mail address associated with the user and the computing device of the user;

transmitting a short message service message comprising the encrypted initial transaction data to a short message service number associated with the user and the computing device of the user;

transmitting a multimedia messaging service message comprising the encrypted initial transaction data to a multimedia messaging service number associated with the user and the computing device of the user; and transmitting a near field communication message comprising the encrypted initial transaction data from a point of sale device of the merchant to the computing device of the user.

14. The computer program product of claim 8, wherein the computing device associated with the transaction comprises the computing device of the user or a computing device associated with the merchant.

15. A computer implemented method for secure transfer of encrypted resources and asynchronous execution, said computer implemented method comprising:

receiving, by a processor of a merchant system, a request to utilize a secure transaction process for execution of a transaction between a user and a merchant, wherein the request is received from a computing device associated with the transaction;

identifying, by the processor of the merchant system, initial transaction data comprising at least a transaction amount, a transaction session code, merchant account information, and user contact information;

encrypting, by the processor of the merchant system, the initial transaction data;

transmitting, by the processor of the merchant system, the encrypted initial transaction data to a computing device of the user;

receiving, by a financial institution application stored on the computing device of the user, the initial transaction data identifying a triggering code;

decrypting, on the financial institution application using a decryption key stored on the computing device of the user, the transmitted encrypted initial transaction data;

identifying, from the financial institution application stored on the computing device of the user, a payment method of the user to be used for execution of the transaction;

determining, by the financial institution application stored on the computing device of the user, that the identified payment method of the user is authorized to provide the transfer amount;

transmitting, by the financial institution application stored on the computing device of the user, full transaction data to a financial institution server for execution of the event, wherein the full event data comprises the initial event data and the identified payment method; and receiving the full event data at the financial institution server to execute the event, transmitting, by the financial institution server to the merchant system, a notification comprising at least a confirmation that the user is authorized to make the event, an indication that the event amount will be provided to the merchant, the event session code, the event amount, and a managing entity reference token associated with the event.

16. The computer implemented method of claim 15, wherein transmitting the encrypted initial transaction data to the computing device of the user comprises at least one of:

transmitting an electronic mail message comprising the encrypted initial transaction data to an electronic mail address associated with the user and the computing device of the user;

transmitting a short message service message comprising the encrypted initial transaction data to a short message service number associated with the user and the computing device of the user;

transmitting a multimedia messaging service message comprising the encrypted initial transaction data to a multimedia messaging service number associated with the user and the computing device of the user; and transmitting a near field communication message comprising the encrypted initial transaction data from a point of sale device of the merchant to the computing device of the user.

* * * * *